United States Patent [19]

Matteelli et al.

[11] 4,356,088
[45] Oct. 26, 1982

[54] ACTIVATED DEPOLLUTION BOOM

[75] Inventors: Rolando Matteelli; Brunello Ciuti, both of San Donato Milanese, Italy

[73] Assignee: Snamprogetti S.p.A., Milan, Italy

[21] Appl. No.: 188,553

[22] Filed: Sep. 18, 1980

[30] Foreign Application Priority Data

Oct. 12, 1979 [IT] Italy .............................. 26444 A/79

[51] Int. Cl.³ ............................................. E02B 15/04
[52] U.S. Cl. ...................... 210/198.1; 210/242.1; 210/925
[58] Field of Search .................... 210/924, 925, 242 S, 210/198.1, 242.1

[56] References Cited

U.S. PATENT DOCUMENTS

| | | | |
|---|---|---|---|
| 3,221,884 | 12/1965 | Muller | 210/923 |
| 3,457,168 | 7/1969 | Malmbey et al. | 210/924 |
| 3,567,019 | 3/1969 | Headrick | 210/924 |
| 3,657,125 | 4/1972 | Strickman | 210/924 |
| 3,667,608 | 6/1972 | Burroughs | 210/924 |
| 3,669,275 | 6/1972 | Down | 210/924 |
| 3,676,357 | 7/1972 | Ciuti et al. | 210/693 |
| 3,702,657 | 11/1972 | Cunningham et al. | 210/924 |
| 3,739,913 | 6/1973 | Bogosion | 210/924 |
| 3,988,932 | 11/1976 | Baier | 210/925 |
| 4,098,694 | 7/1978 | Perlaky | 210/925 |
| 4,190,531 | 2/1980 | Falk | 210/925 |
| 4,197,197 | 4/1980 | Abara et al. | 210/925 |
| 4,197,204 | 4/1980 | Mathes | 210/924 |

Primary Examiner—Ivars C. Cintins
Attorney, Agent, or Firm—Morgan, Finnegan, Pine, Foley & Lee

[57] ABSTRACT

The invention relates to a boom for depolluting water surfaces of crude petroleum and its derivatives or from other oily substances, comprising one or more sheaths of mesh fabric filled with an active substance constituted by 10 to 90% of a support of low specific gravity, 9 to 80% of a surface active agent, and 1 to 10% of a wetting agent, and also preferably filled with granules or flocks of expanded material in a quantity of 5 to 80% by weight relative to the active substance.

7 Claims, 8 Drawing Figures

ACTIVATED DEPOLLUTION BOOM

This invention relates to an activated depollution boom. More particularly, this invention relates to an activated boom for use in depolluting water surfaces from crude petroleum and its derivatives, or from other oily substances.

Pollution of water surfaces by crude petroleum and its derivatives, or by other oily substances, is becoming more serious and complicated.

Consequently, in order to obviate the effects pollution has on the water ecological equilibrium, activity leading to new means for preventing pollution and for combating it once it has occurred are being encouraged.

Chemical, absorbing, dispersing or sinking means exist which, in some situations, can contribute to solving the depollution problem, although some may induce harmful effects which often accompany their primary effect.

The results have been to develop "clean" prevention and depolluting means, i.e. those based on mechanical or physical action which ensures the absence of toxic action or which minimize the environmental equilibrium damage. For this purpose, new systems have been developed for preventing pollution of water surfaces, or for restricting already polluted water surfaces, from which the pollutant is prevented from escaping and increasing the polluted surface area.

These floating barriers are generally known by the name of "booms".

There are a great number of means for collecting the floating pollutant, based on a "skimming" system, adsorption on discs, adsorption on porous panels, or separation by centrifuging.

These systems are mounted on static or self-propelled floating platforms.

In certain cases self sufficient boats are used which can move during the entire depollution operation.

Very often, these collecting means and the booms cooperate because a collection apparatus operating in a polluted zone can show a much greater efficiency if the pollutant is urged closer thereto by the booms. In this kind a further component can be used, i.e. a floating substance which urges and concentrates the pollutant into certain preferential zones by causing variations in the surface tension.

This type of substance exists, and is described in Italian Pat. No. 858,634 of July 1972 and its counterpart U.S. Pat. No. 3,676,357 of July 1972.

It is fairly obvious that in a system closed by booms, the collection apparatus must be operated inside the closed-off section in order to obtain the required effect. Consequently, it will be realised that if the booms could in some manner be activated with the substance of the aforesaid Italian Pat. No. 858,634 and its counterpart U.S. Pat. No. 3,676,357 in order to obtain a prolonged surface action, a meaningful contribution could be made in depolluting water by the containing and collection apparatus.

The problem of activating the booms with the active substance described in Italian Pat. No. 858,634 and its counterpart U.S. Pat. No. 3,676,357 of July 1972 is however complicated by the fact that the boom must float even when it contains the active substance, and must allow said active substance to pass gradually and uniformly. Moreover, the boom must not allow the active substance to escape until it is on the polluted surface.

It has been found possible to overcome the aforesaid drawbacks by using a boom having a sheath of a fabric mesh filled with a mixture of the active substance described in Italian Pat. No. 858,634 and its counterpart U.S. Pat. No. 3,676,357 of July 1972, the disclosure of which is incorporated herein by reference, and the granules or flocks or an expanded material. The present invention provides an activated depollution boom having one or more sheaths of fabric mesh filled with an active substance essentially consisting of about:

10–90% of a support of low specific gravity
9–80% of a surface-active agent
1–10% of a wetting agent and
5% to 80% by weight of granules or flocks of an expanded material with respect to the active substance.

The expanded material is chosen from expanded polystyrene, polyethylene or polyurethane, or other materials of similar specific gravity which are not strongly hygroscopic.

The sheath filled with active substance is preferably provided with bands at distances of a few centimeters apart which have the double purpose of throttling the sheath so as not to allow excessive movement of the filler along the length of the sheath, especially during its make-up and installation, and for keeping the sheath connected to one or more support and connection cables of suitable length.

IN THE DRAWINGS

Figure 4:
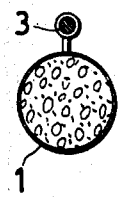
FIG. 4 is a cross-sectional view of FIG. 3 taken along the lines 4,4.
Figure 5:
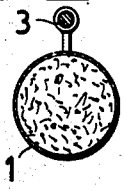
FIG. 5 is a longitudinal view, partly in section, of still another embodiment of the invention, wherein the floats are cylindrical in form.
Figure 6:
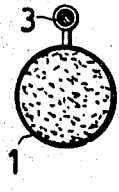
FIG. 6 is a cross-sectional view of FIG. 5, taken along the lines 6,6.
Figure 1:
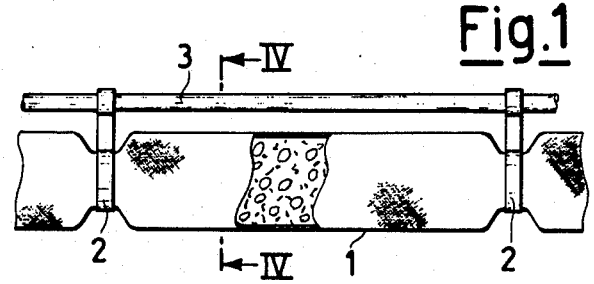
FIG. 1 is a longitudinal view, partly in section, of one embodiment of the invention including a sheath, bands and a support cable, wherein the floating material is dispersed within the sheath.
Figure 2:
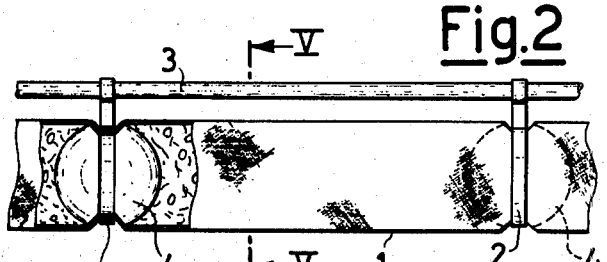
FIG. 2 is a cross-sectional view of FIG. 1, taken along the lines 2,2.
Figure 3:
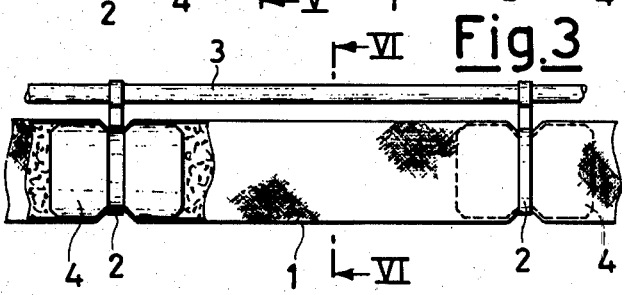
FIG. 3 is a longitudinal view, partly in section, of another embodiment of the invention, wherein the floats are spherical in form and positioned at the bands within the sheath.

Referring first to FIG. 1, there is shown the sheath 1 with the spaced bands 2 therearound. In this embodiment, the floating material is in the form of granules 4 dispersed throughout the sheath 1. In the embodiment of the invention shown in FIGS. 3 and 4, the floats 4 are spherical in form and in the embodiment of the invention shown in FIGS. 5 and 6, the float 4 is cylindrical in form. In each of these embodiments the bands 2 are connected to one or more supporting and connection cables 3 of suitable length.

Figure 7:
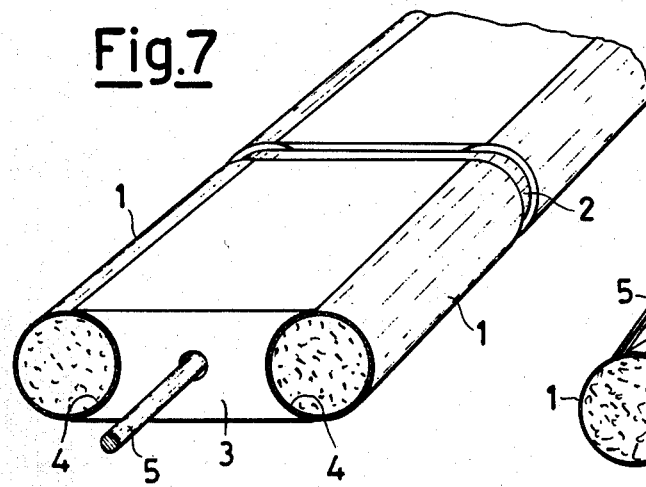
FIG. 7 is a partial perspective view of a further embodiment of the invention, wherein the float is positioned between opposing sheaths.
Figure 8:
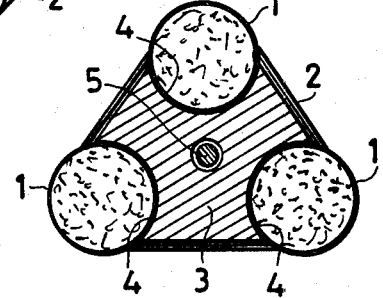
FIG. 8 is a cross-sectional view of another embodiment of the invention, wherein the float is triangular and is positioned between three sheaths.

As shown in FIGS. 7 and 8 moreover, the float 4 can be placed between the sheaths 1 with the bands 2 securing the sheaths thereto. As shown in these illustrative embodiments, one or more support cables 5 can pass through the float 4.

The preferred version of the boom according to the present invention, which is most functional both from the manufacture and use aspects and which more specifically constitutes the subject matter of the present invention, is a boom composed of:

(a) a central core of expanded material of appropriate section of polystyrene, polyethylene, polyurethane or other plastic materials which can be expanded into suitable form and specific gravity and have the general mechanical characteristics which, with the aid of possible incorporated cables, provide a support for the containers of the active substance.

(b) a number of active members constituted by sheaths of mesh fabric of cotton or nylon or other natural or synthetic material, the thickness and dimensions, together with the size and frequency of the meshes, being chosen to allow either migration of the active substance in terms of its total composition, or, when considered opportune, migration only of the soluble components of the composition of Italian Pat. No. 858,634 and its counterpart U.S. Pat. No. 3,676,357.

(c) bands mounted spaced apart, possibly in suitable grooves which can be provided in the central member, the purpose of said bands being to compress the sheath containing the active substances at properly determined distances, so that the substance remains as uniformly distributed in the sheath as possible.

Said bands are of elastic, plastics or metal material, and either endless or non-endless, in which latter case they are easily weldable or otherwise attachable to the entire unit during the assembly of the various parts constituting the boom. However the boom is constituted, it is important that it be enclosed, after formation, in a plastic sheath and wound therewith into coils until installation. The reason for such sheaths is to preserve the active substance from moisture during storage, and to prevent escape of active substance before installation.

In addition to adding the plastic sheath on packaging, the active substance can be protected by sizing the mesh fabric sheath containing the active substance using water-soluble sizing (fish gelatine, casein or other similar sizing), which closes the pores during storage and transportation of the boom, and dissolves in the water so leaving the active substance free to migrate in accordance with the present invention.

The FIGS. 7 and 8 show designs for two booms. In FIG. 7 a boom consisting of two sheaths 1 filled with active substance or granules or flocks according to the invention is connected by bands 2 to an expanded material 4 provided with two grooves 5 constituting the seat for the sheaths 1. in FIG. 8 a boom constituted by three sheaths 1 filled with active substance and granules or flocks according to the invention is connected by bands 2 to an expanded material 4 provided with three grooves 5 constituting the seat for the sheaths 1.

As shown the support cable 3 in the FIGS. 7 and 8 passes through the expanded material 4. All the designs indicated in the description of the present invention are given by way of non-limiting examples. The dimensions and shapes of the various components of the active boom are chosen on the basis of the various requirements, taking into account the different facilities for obtaining at any given time the most technically and economically suitable raw or semi-finished material on the market. The activated boom according to the present invention has the following characteristics:

(1) low cost;
(2) prolonged activity with time;
(3) easy installation and recovery;
(4) easy reactivation or destruction after use.

We claim:

1. A boom which floats in water for depolluting water surfaces of crude petroleum and its derivatives, and of other oily substances, comprising:

an outer mesh fabric sheath filled with an active substance and an expanded substance, wherein the sheath has removable means thereon which close the openings in the mesh fabric of the sheath until it is in water at which time said means are removable in water so that the active substance is contained within said sheath prior to use and will migrate through the openings in the mesh fabric of said sheath to depollute the water surfaces when the boom is floating in polluted waters, wherein the active substance essentially consists of 10 to 90% by weight of a low specific gravity support, 9 to 80% of a surface active agent, and 1 to 10% by weight of a wetting agent, and wherein the expanded substance essentially consists of 5 to 80% by weight relative to the active substance of granules or flocks and keeps the boom afloat, a cable spaced apart and alonside said filled mesh fabric sheat for supporting said sheath, and a plurality of bands spaced apart along the length of said sheath which encircle and throttle said sheath for uniform distribution of the substances therein and which are connected to said cable for support thereof.

2. A boom which floats in water for depolluting water surfaces of crude petroleum and its derivatives, and of other oily substances, comprising:

an outer mesh fabric sheath filled with an active substance essentially consisting of 10 to 90% by weight of a low specific gravity support, 9 to 80% by weight of a surface active agent, and 1 to 10% by weight of a wetting agent, wherein the sheath has a sizing agent thereon which closes the openings in the mesh fabric of the sheath but which will dissolve in water so that the active substance is contained within said sheath prior to use and will migrate through the mesh fabric thereof to depollute water surfaces when the boom is floating in polluted waters, a plurality of cores of an expanded substance which are spaced apart along the length of said sheath with the active substance therebetween and which keeps the boom afloat, a cable for supporting the filled mesh fabric sheath, and a plurality of bands spaced apart along the length of said sheath, which encircle and are tightened about said sheath and said cores for fixing the position of said cores and for uniform distribution of the active substance between said cores, and which are connected to said cable for supporting said sheath.

3. The boom as claimed in claim 2, wherein each of said cores has a shape selected from the group consisting of cylinders and spheres with grooves therein for seating said band therearound.

4. A boom which floats in water for depolluting water surfaces of crude petroleum and its derivatives, and of other oily substances, comprising:

a plurality of mesh fabric sheaths spaced apart from one another and filled with an active substance essentially consisting of 10 to 90% by weight of a low specific gravity support, 9 to 80% of a surface active agent, and from 1 to 10% by weight of a wetting agent, wherein the sheath has a sizing agent thereon which closes the openings in the mesh fabric of the sheath but which will dissolve in water so that the active substance is contained within said sheath prior to use and will migrate through the mesh fabric thereof to depollute water surfaces when the boom is floating in polluted water, an expanded substance between said sheaths for holding said sheaths in their spaced apart relationship, wherein said expanded substance keeps the boom afloat, and a plurality of bands spaced apart from each other which encircle said sheaths and said expanded substance therebetween for securing said sheaths to said expanded substance.

5. The boom as claimed in claim 4, wherein there are two opposing sheaths, and wherein the expanded substance has opposing grooves in which said sheaths are seated.

6. The boom as claimed in claim 4, wherein there are three sheaths in a triangular configuration, and wherein the expanded substance therebetween includes grooves in which said sheaths are seated.

7. The boom as claimed in claim 4, wherein a cable extends through a central portion of said expanded substance for supporting said sheaths.

* * * * *

UNITED STATES PATENT AND TRADEMARK OFFICE
CERTIFICATE OF CORRECTION

PATENT NO. : 4,356,088
DATED : October 26, 1982
INVENTOR(S) : Rolando Matteelli and Brunello Ciuti It is certified that error appears in the above-identified patent and that said Letters Patent is hereby corrected as shown below:

Column 4, line 28, "alonside" should read -- alongside -- .

Column 4, line 65, "band" should read -- bands -- .

Signed and Sealed this

Eighth Day of March 1983

[SEAL]

Attest:

GERALD J. MOSSINGHOFF

*Attesting Officer*  *Commissioner of Patents and Trademarks*